United States Patent [19]

Baba

[11] 4,034,835

[45] July 12, 1977

[54] CLUTCH AND THROTTLE CONTROL MECHANISM

[75] Inventor: Masanao Baba, Takarazuka, Japan

[73] Assignee: Nippon Cable System Inc., Japan

[21] Appl. No.: 557,963

[22] Filed: Mar. 13, 1975

[30] Foreign Application Priority Data

July 26, 1974 Japan .............................. 49-86193
Oct. 12, 1974 Japan .............................. 49-117449

[51] Int. Cl.² .................... B60K 21/00; F16D 47/00
[52] U.S. Cl. .................................. 192/.098; 74/876
[58] Field of Search ........... 192/.096, .098; 74/876, 74/877, 878

[56] References Cited

U.S. PATENT DOCUMENTS

| | | | |
|---|---|---|---|
| 2,884,109 | 4/1959 | Morse | 192/.098 |
| 2,907,421 | 10/1959 | Morse et al. | 192/.096 |
| 2,935,891 | 5/1960 | Morse | 192/.098 X |
| 2,966,969 | 1/1961 | Morse | 192/.098 X |
| 2,973,069 | 2/1961 | Morse | 192/.096 |
| 3,741,044 | 6/1973 | Baba | 192/.096 |
| 3,858,699 | 1/1975 | Comstedt | 192/.098 |

*Primary Examiner*—Benjamin W. Wyche
*Attorney, Agent, or Firm*—Armstrong, Nikaido & Marmelstein

[57] ABSTRACT

Control mechanism adapted to operate both the clutch and throttle of engine by a single main lever. The mechanism assures that the throttle is held out of operation until the clutch is completely shifted, while the clutch is held in its shifted position during the operation of the throttle.

12 Claims, 8 Drawing Figures

CLUTCH AND THROTTLE CONTROL MECHANISM

SUMMARY OF THE INVENTION

This invention relates to a novel control mechanism, and more particularly to a control mechanism for controlling both the clutch and throttle of marine engine by a single lever.

BACKGROUND OF THE INVENTION

Control mechanisms of the type employing a single lever need to be easily operable free of troubles even by unskilled persons and therefore must fulful the essential requirements of being so adapted that the throttle is held out of operation until the clutch of engine is completely shifted and having a construction by which the clutch is always held in its shifted position during the operation of the throttle. However, none of the control mechanisms heretofore known can fully satisfy these requirements.

OBJECTS OF THE INVENTION

An object of this invention is to provide a mechanism which fully satisfies the foregoing essential requirements and which is very simple in construction and operable free of any trouble.

Another object of this invention is to provide a mechanism including an auxiliary lever which assures fine control of the throttle.

Another object of this invention is to provide a mechanism by which the throttle alone is made operable for warming up the engine with the clutch locked in neutral position so that the boat will not advance inadvertently.

Still another object of this invention is to provide a mechanism by which the clutch and throttle of engine are easily operable by individual levers respectively when so desired.

DETAILED DESCRIPTION OF THE INVENTION

Figure 1:
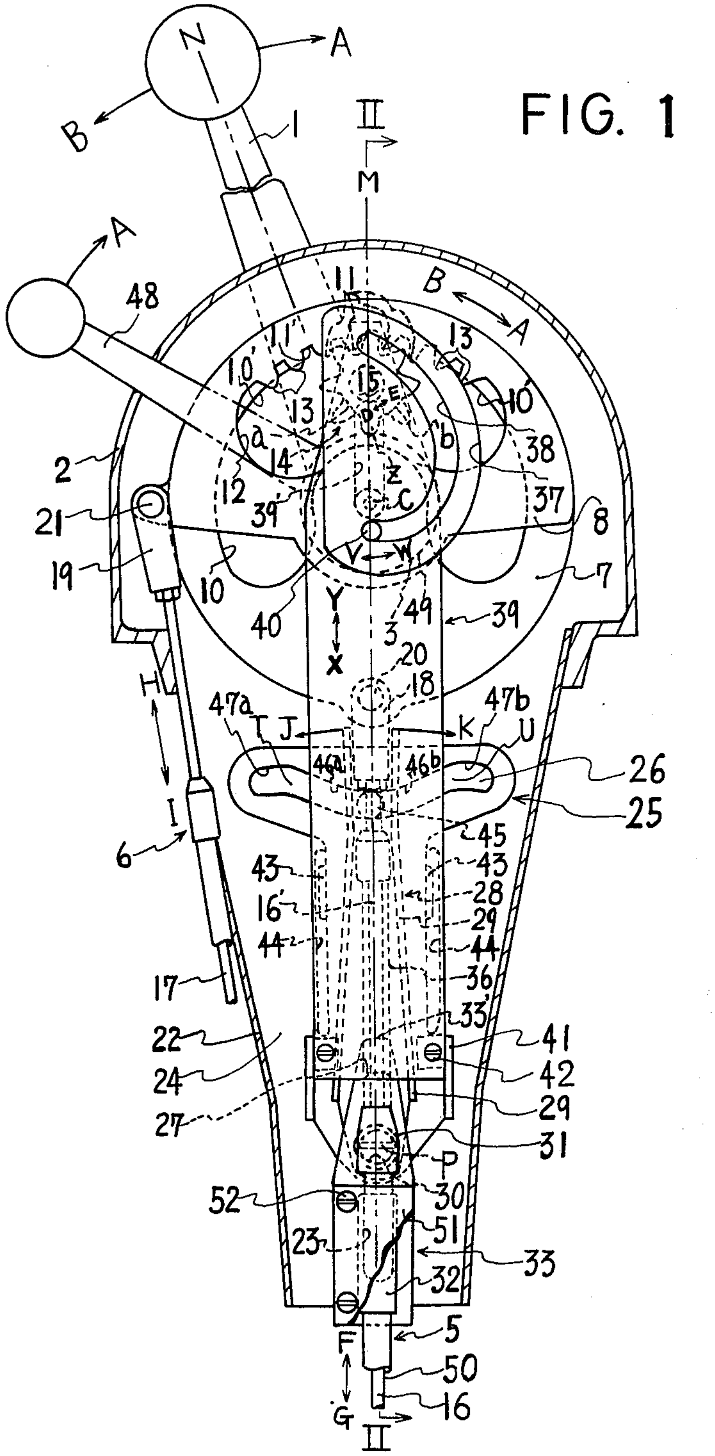
FIG. 1 is a front view partly broken away and showing the principal part of an embodiment of this invention.
Figure 2:
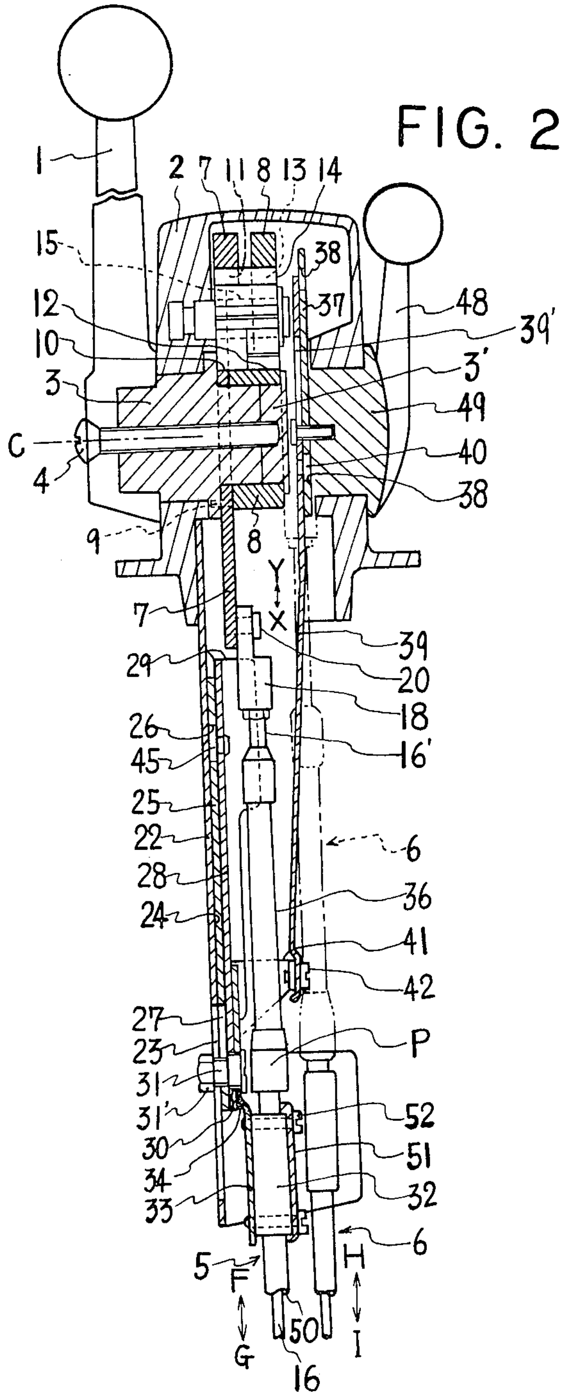
FIG. 2 is a view in section taken along the line II—II in FIG. 1.

With reference to FIGS. 1 and 2, a main lever 1 is fixedly mounted by a bolt 4 on a shaft 3 rotatably supported by a casing 2. Fixed by a pin 9 to the shaft 3 is a throttle operating member 7 connected to a throttle cable 5 for operating the throttle of engine. A clutch operating member 8 connected to a clutch cable 6 for operating the clutch is rotatably supported by the shaft 3 and is retained in position by a washer 3'.

The operating members 7 and 8 are formed with circular arc apertures 10 and 12 respectively which are concentric with the shaft 3 as at C. The members 7 and 8 are formed, each in one side surface of its apertured portion, with several teeth 11 and 13. The number of the teeth 11 is smaller than that of the teeth 13, and the circular arc aperture 10 is much larger than the circular arc aperture 12. The inner surface 10' of the aperture 10 is defined by a circular arc surface which is suitably higher than the bottom 11' of the tooth 11.

A gear 14 is rotatably supported by a pin 15 mounted on the casing 2 and meshes with the teeth 11 and 13. The portion of the gear 14 which is positioned in the aperture 10 of the throttle operating member 7 has untoothed portions *a* and *b*. Depending on the number of the teeth of the gear 14, only one untoothed portion may be provided.

The parts described above operate as follows. The main lever 1, when turned in a direction A from neutral position N, rotates the shaft 3, which turns the throttle operating member 7 in the direction A, turning the gear 14 in a direction D in meshing engagement with the teeth 11 of the member 7. The clutch operating member 8, with its teeth 13 meshing with the gear 14, is turned also in the direction A.

Figure 3:
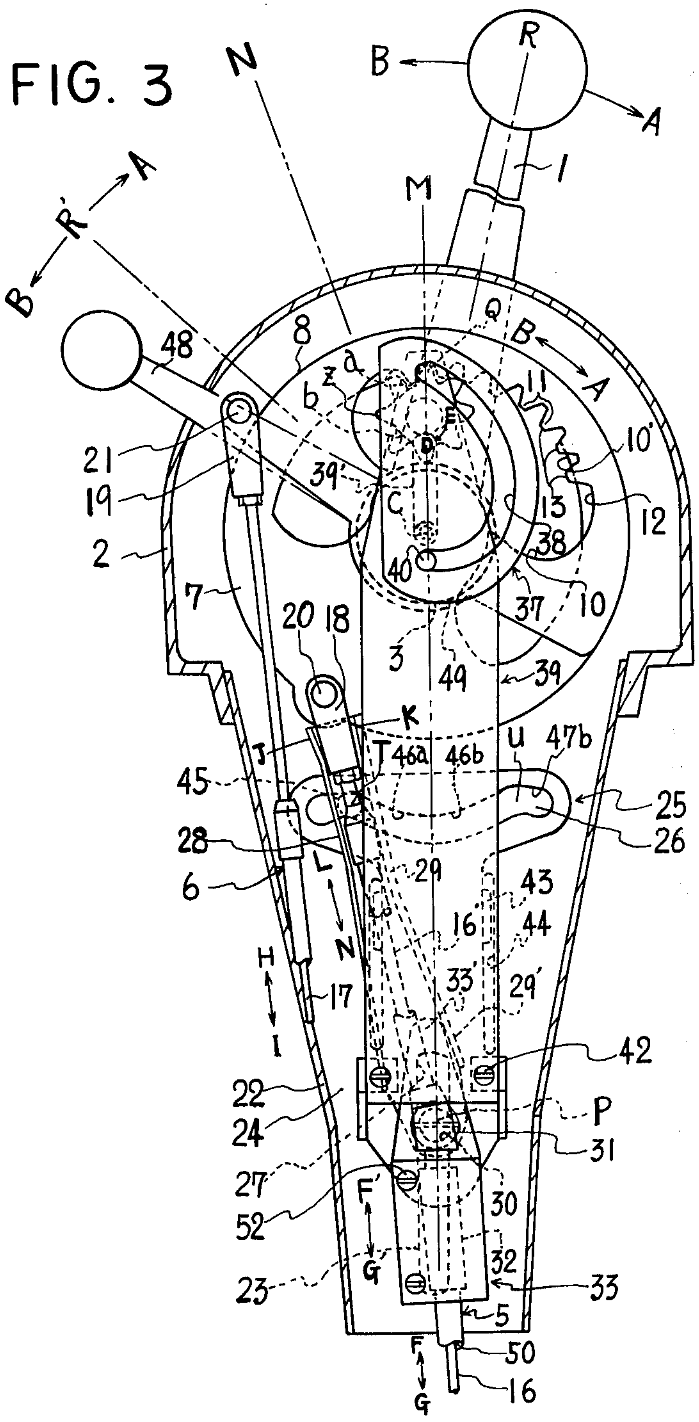
FIG. 3 is a front view showing the embodiment during operation.

As seen in FIG. 3, the rotation of the throttle operating member 7 in the direction A pulls the inner wire 16 of the throttle cable 5 toward a direction F. At the same time, the rotation of the clutch operating member 8 in the direction A pulls the inner wire 17 of the clutch cable 6 in a direction H.

The throttle cable has an end connector 18 which is pivoted to the member 7 so as to position on a centerline M passing through the center C, when the lever 1 is in position N. Accordingly, when the lever 1 in position N is turned toward the direction A or B, the inner wire 16 is pulled in the direction F only slightly in the beginning. On the other hand, the clutch cable 6 has an end connector 19 which is pivoted to the member 8 at a position on a line extending from the center C at right angles to the centerline M when the lever 1 is in position N, so that the inner wire 17 is pulled in the direction H or I markedly at first.

Further rotation of the throttle operating member 7 in the direction A turns the gear 14 further toward the direction D, bringing the untoothed portion *a* is opposing relation to the inner surface 10', whereupon the gear 14 comes to a halt. While the lever 1 further turns from position R toward the direction A, two teeth Z and Q on the opposite sides of and adjacent to the untoothed portion *a* of the gear 14 are in sliding contact with the inner surface 10', with the gear 14 held against rotation, whereby the clutch operating member 8 is locked against turning.

With the clutch so adapted that it has been completely shifted, for example, to forward position when the clutch operating member is located in its locked position, the lever 1, when turned from position R further toward in the direction A, pulls the inner wire 16 of the throttle cable alone in the direction F, permitting the boat to advance at a high speed.

When the lever 1 in the above-mentioned position is turned to position N, the inner wire 16 of the throttle cable 16 is first pushed backward in a direction G to slow down the engine, and the clutch is thereafter shifted to neutral position.

If the lever 1 is turned toward a direction B from position N to position R', both the operating members 7 and 8 are turned toward the direction B (not shown), with the result that the inner wire 17 of the clutch cable is pushed in a direction I to shift the clutch for example to reverse position. With the turning of the lever from position R' further toward the direction B, the inner wire of the throttle cable is pulled in the direction F, whereby the boat is propelled backward.

Before the clutch is completely shifted, the inner wire 16 of the throttle cable 5 is slightly pulled in the direction F, this causing the throttle to advance to some extent. Usually although this is not substantially objectionable, the clutch is shifted preferably while the engine is being driven at the lowest speed. If the engine is already rotating at a considerable speed when the clutch is to be shifted, it becomes impossible to propel the boat forward or backward at a very low speed, and the boat is prone to troubles, or possibly to accidents, when coming ashore or when driven where there are many obstacles. Thus it is desired not to advance the throttle before the clutch is completely shifted.

Furthermore because the throttle cable 5 is subjected to a circular arc motion at its end, the cable end is fixed leftward or rightward from the centerline M about the position where it is fixed by a set plate 33. Since the cable of this type is given some flexibility at a point P where a cap 32 fixed to the end of an outer tube 50 is connected to a guide tube 36, it is favorable to secure the cap 32 to a frame 22 by means of the set plate 33 so to render the throttle cable movable within the flexible range. However, the range of angle of flexure is usually limited to about 6 degrees in order to prevent break of the inner wire 16 due to flexure. Consequently there arises the necessity of using a greatly elongated frame 22, which renders the construction unsightly and costly.

The invention also provides a mechanism for overcoming the above-mentioned drawback.

With reference to FIGS. 1 and 2, a frame 22 is fixedly joined to the casing 2. The frame is formed with a slot 23. A cam plate 25 having a slot 27, a cam aperture 26 and pawls 43 is placed on the frame surface 24 and is slidable in parallel to the centerline M. Further disposed on the cam plate 25 is an idly movable member 28 having a bore 30 and lugs 29 coextensive with the throttle cable 5 from the point P to its end as if surrounding the cable 5. Pivotably mounted on the idly movable member 28 is a set plate 33 having a bore 34 and adapted to secure the cap 32 to the plate 33 with a cover 51 and bolt 52.

The idly movable member 28 is provided with a pin 45 which is movably inserted in the cam aperture 26.

A pin 31 loosely extends through the bores 34 and the slots 27 and 23 and retained by a nut 31'.

A rod 16' connected to the inner wire 16 extends, approximately from the cap 32 to the end connector 18, through a guide tube 36. (The term "inner wire 16" is to be interpreted hereinafter as including the rod 16'. Part of the end connector 18 and the guide tube 36 are surrounded by the lugs 29 of the idly movable member 28 on the opposite sides thereof.

To render the cam plate 25 movable in parallel to the centerline M, the pawls 43 shown in FIG. 1 are inserted in slits 44 in the frame 22.

The cam aperture 26 comprises, as arranged symmetrically of the centerline M, cam grooves 46*a*, 46*b* and cam grooves 47*a*, 47*b* which are different in curvature but are continuous in the form of a slot. The grooves 46*a* and 46*b* are in the form of a curved groove approximately concentric with the throttle operating member 7, whilst the grooves 47*a* and 47*b* are curved as centered about the point P. When the throttle operating member 7 is turned in the direction A or B, the pin 45 on the idly movable member 28 first moves along the cam groove 46*a* or 46*b*, causing the member 28 to move in a direction L as seen in FIG. 3 without being displaced from the end connector 18. The movement of the inner wire 16 in the direction F due to the circular arc motion of the end connector 18 at this time is offset by the movement of the outer tube 50 in a direction F' which tube is secured to the set plate 33. Thus the throttle will not be advanced. The throttle cable 5 must of course be suitably connected to the engine so as to permit the outer tube 50 to move axially thereof as described above.

The mechanism is so constructed that when the pin 45 comes to a point T where the grooves 46*a* and 47*a* adjoin each other or to a point U where the grooves 46*b* and 47*b* adjoin each other, the rotation of the clutch operating member has completely shifted the clutch through the clutch cable 6, so that when the lever 1 is turned for example from position R further toward the direction A to turn the throttle operating member 7, the pin 45 advances into the cam groove 47*a*, no longer drawing the idly movable member 28 in the direction L but turning the guide tube 36 and idly movable member 28 further in the direction J. Consequently, the inner wire 16 which is pulled in the direction F advances the throttle.

The lever 1 in position N, when turned toward the direction B (not shown), inclines the throttle cable 5 in the direction K, while pushing the inner wire 17 of the clutch cable 6 in the direction I to shift the clutch for example to reverse position. The pin 45 thereafter enters the cam groove 47b, and the turning of the throttle operating member pulls the inner wire 16 in the direction F and advances the throttle.

When the end of the throttle cable 5 turns about the point P in the direction J or K through an extreme angle of flexure, the lower end 29' of the lug of the idly movable member 28 inclined with the throttle cable pushes the side of pointed end 33' of the set plate and inclines the same in the same direction. This construction renders the throttle cable operable free of objectionable flexure, durable, and usable with a relatively short frame 22.

The means for preventing the operation of the throttle cable 5 at the initial stage and the inclination means described above are not only useful for the operation of throttles of marine engines but also employable in various control devices in which the connected end of control cable performs a circular arc motion.

Although the cam aperture 26 in the present embodiment is in the form of a continuous series of cam grooves having different curvatures, the cam grooves 47*a* and 47*b* need not be provided when the control mechanism is so designed that the clutch is shifted when the throttle operating member 7 in the position of FIG. 1 has been turned about 90°. In this case, the cam aperture may consists only of a curved groove substantailly concentric with the throttle operating member 7.

The operation of throttle by the main lever 1, although suitable for usual operation as when the boat is driven at oridinary speeds, may sometimes encounter difficulties in fine control operation required for example when the boat leaves the shore or comes ashore. Accordingly the present embodiment further includes fine control means for the throttle cable 5.

With reference to FIGS. 1 and 2, an auxiliary lever 48 has a shaft 49 rotatably supported by the casing 2. A cam 37 fixedly mounted on the shaft 49 turns in a direction V when the auxiliary lever is turned in the direction A, causing a pin 40 inserted in a cam aperture 38 to depress a link plate 39 in a direction X. The link plate 39 is movable in that direction by being guided by a slot 39′ and a pin 40 inserted therein.

The distal end of the link plate 39 is secured to the cam plate 25 by bolts 42. The movement of the link plate in the direction X moves the cam plate 25 also in the direction X and depresses the idly movable member 28 similarly in the direction X by virtue of engagement of the pin 45 in the cam aperture 26. Also movable with the cam plate 25 is the set plate 33 mounted on the movable member 28 by the pin 31.

Consequently, the outer tube 50 of the throttle cable is pushed in the direction G to produce the same result as when the inner wire 16 is pulled in the direction F and to thereby advance the throttle of engine.

The cam aperture 38 of the cam 37 has a shape, for example, resembling one half of the heart and the cam 37, when turned, produces a very fine movement of the link plate 39, namely of the outer tube 50.

The fine control of the throttle achieved by the auxiliary lever 48 is very effective when idling or warming up the engine.

The cam aperture 38, when suitably shaped, prevents the cam 37 from turning reversely even when the cam is subjected to a load by the outer tube 50. The reverse rotation of the cam can be prevented, for example, by forming the cam aperture 38 in such shape that the angle between the tangential line thereof with the centerline M is always larger than a certain angle (about 45 degrees) and by giving slight resistance to the rod 49 against rotation relative to the casing 2.

As will be apparent from the foregoing description, the present embodiment possesses all the functions required of control mechanisms of the type described, perfectly holds the throttle out of operation until the clutch is completely shifted, renders the throttle cable durable and assures very fine control of the throttle wherever the throttle operating member 7 is positioned in its turnable range.

Figure 4:
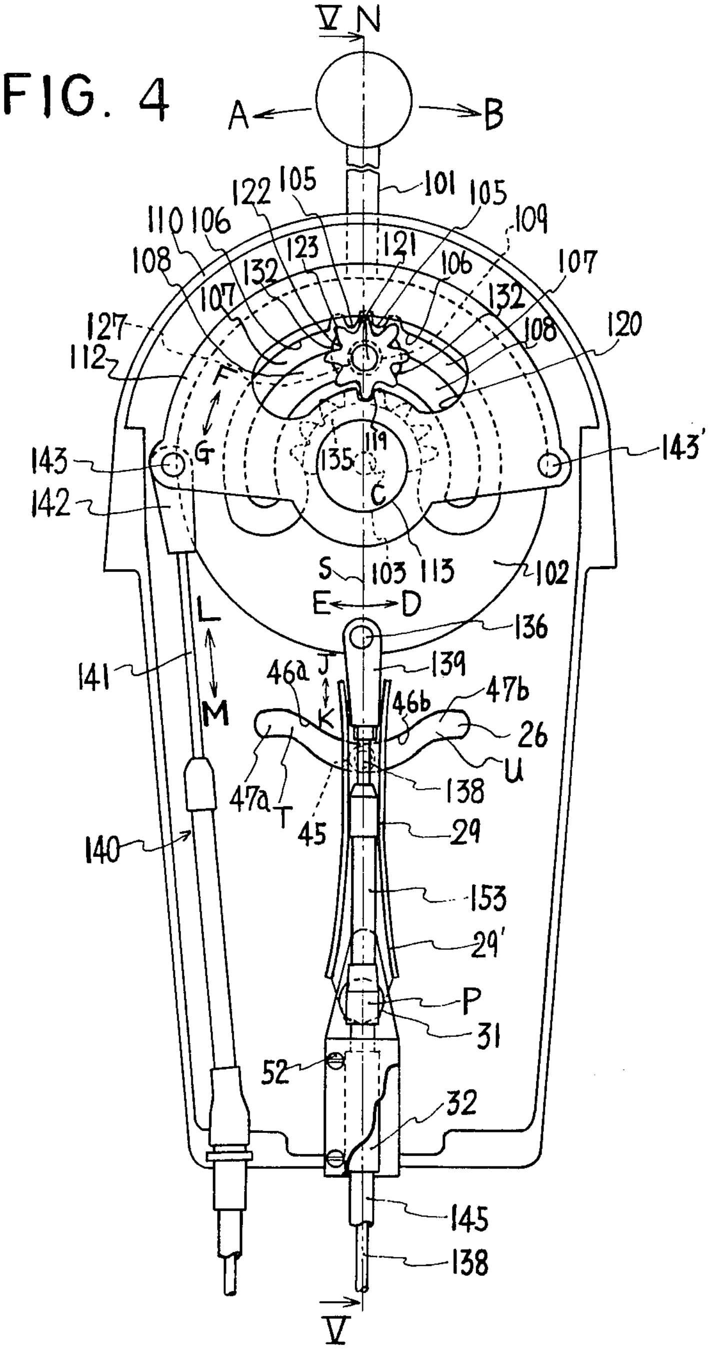
FIG. 4 is a front view showing the rear side of another embodiment of this invention with a cover 114 removed.
Figure 5:
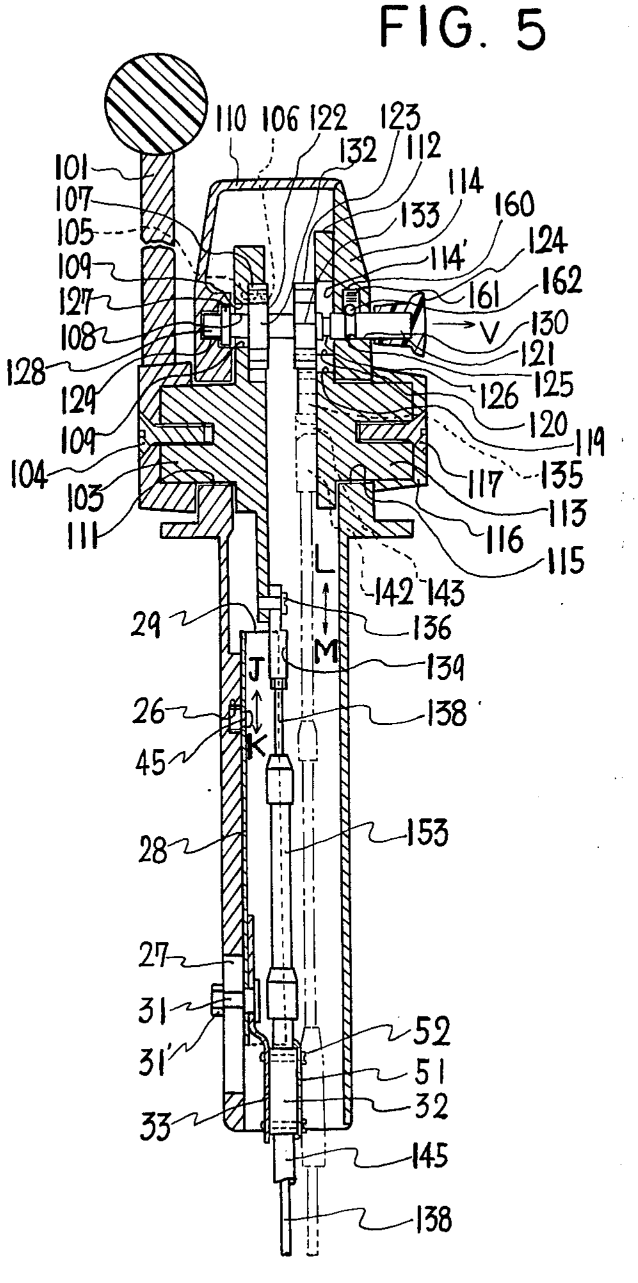
FIG. 5 is a view in section taken along the line V—V in FIG. 4 and showing the same.

Another embodiment of this invention will be described below. With reference to FIGS. 4 and 5, a lever 101 is fastened by a bolt 104 to a shaft 103 projecting from the center of a throttle cable operating member 102. The member 102 is formed with a grooved portion 107 having a circular arc surface 106 extending about the center C of the member 102 and a gear portion 105 formed in the approximate middle of the surface 106. The teeth of the gear portion 105 are suitable higher than the circular arc surface. The grooved portion 107 is formed with a circular arc aperture 108 centered about the center C. The circular arc aperture portion 108 has in the middle thereof circular arc cutouts 109 which permit passage of a disk having a diameter larger than the width of the aperture.

The shaft 103 is rotatably received in a bearing bore 111 in a casing 110, so that when the lever 101 is turned in a direction A or B, the throttle cable operating member also turns therewith.

A clutch cable operating member 112 has a shaft 113 rotatably received in a bearing bore 115 in a cover 114 secured to the casing. As will be described later, the shaft 113 is in the form of a projection like the shaft 103 so that another lever is fixedly mountable thereon. A cap 116 is fitted over the shaft 113 by a bolt 117 to prevent the axial displacement of the shaft.

The clutch cable operating member 112 has a circular arc apertured portion 120 formed with a recess 119 and a gear portion 135 which are centered about the center C.

Figure 6:
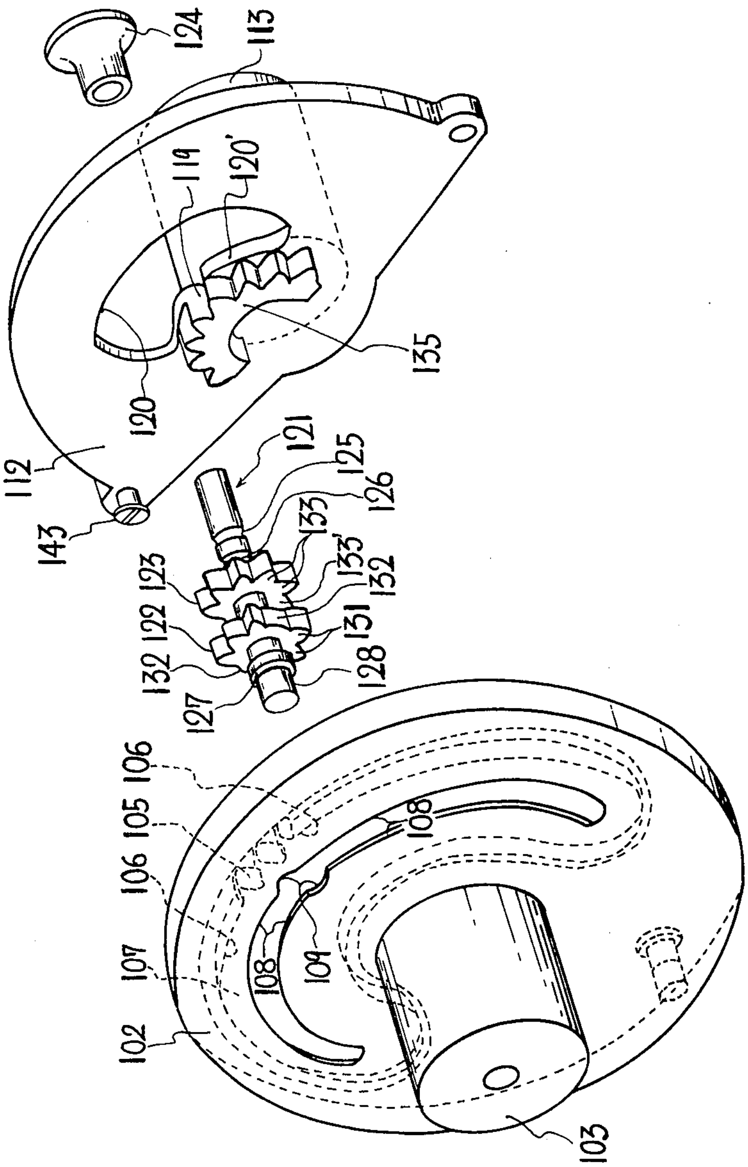
FIG. 6 is an exploded perspective view showing a throttle cable operating member 102, coupling shaft 121 and clutch cable operating member 112 in their relative relationship.

As seen in FIG. 6, a coupling shaft 121 has a gear 122, a gear 123, a knob 124, two grooves 125, 126 and a flange 127. These members are integral with the shaft. The end 128 of the coupling shaft 121 is inserted in a cavity 129 formed in the casing 110, and near the other end of the shaft 121 fitted with the knob 124, the shaft is rotatably received in a bore 130 in the cover 114.

The gear 122 has several teeth 131 and two untoothed portions 132 and 132. The gear 123 has several teeth 133.

The coupling shaft is axially displaceable until the gears 122 and 123 come into contact with the grooved surface 107 of the throttle cable operating member 102 and with the inner surface 114′, of the cover 114 respectively. The gear 122 is meshable with the gear portion 105 of the throttle cable operating member 102, and the gear 123 with the gear portion 135 of the clutch cable operating member 112.

Extending from a suitable potion of the throttle cable operating member 102 is a pin 136, to which is pivoted an end connector 139 fixed to the inner wire 138 of a throttle cable 137 for operating the throttle (not shown) of the engine. Similarly the clutch cable operating member 112 is provided at a suitable portion with a pin 143 to which is pivoted an end member 142 secured to the inner wire 141 of a clutch cable 140.

The pin 136 is so positioned that it is on a centerline S passing through the center C, when the lever 101 in neutral position N. When turned in the direction A or B, the lever 1 rotates the throttle cable operating member 102 in a direction D or E, whereby the inner wire 138 of the throttle cable is pulled in a direction J. When the lever 101 is in position N, the pin 143 is positioned on a line extending from the center C of the clutch cable operating member 112 approximately at right angles to the centerline S. The rotation of the operating member 112 in a direction F or G pulls the inner wire 141 of the clutch cable 140 toward a direction L or pushes the wire in a direction M.

Figure 7:
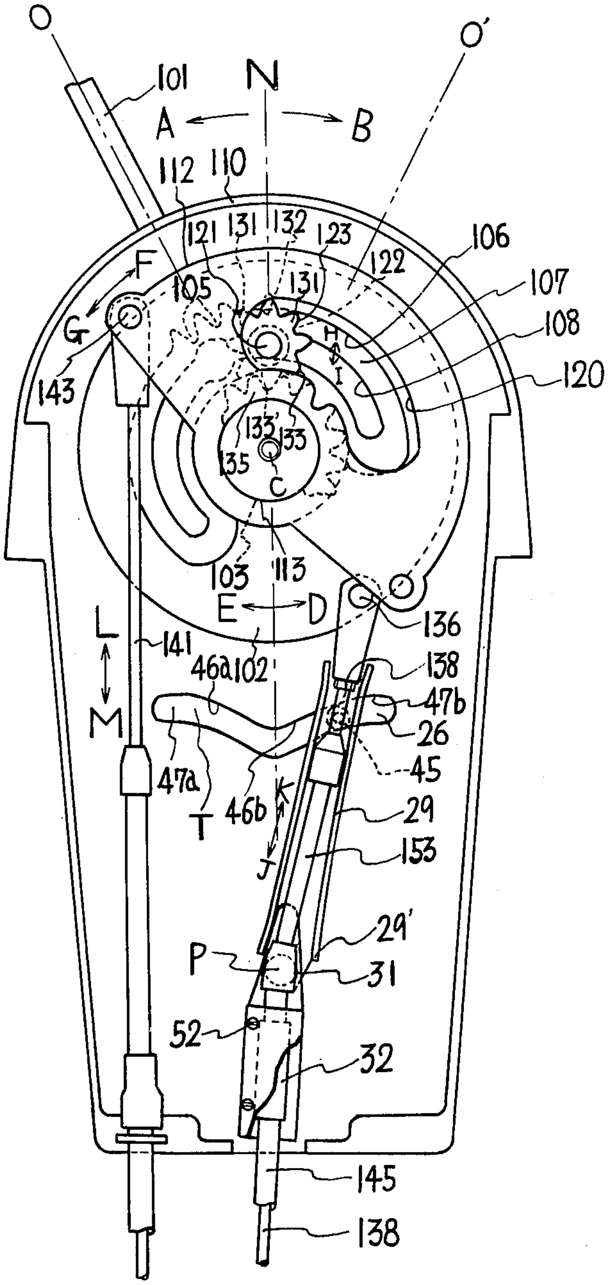
FIG. 7 is a front view showing the embodiment with a lever 101 turned to O position.

The parts described above operate as follows. When the lever 101 in neutral position N is turned a predetermined angle toward the direction A to position O, the throttle cable operating member 102 turns in the direction D as shown in FIG. 7. The gear 122 on the coupling shaft 121 meshing with the gear portion 105 therefore rotates in a direction H, with the result that the teeth 131 and 131 on the opposite sides of the untoothed potion 132 come into contact with the circular arc surface 106 defining the groove 107, whereupon the gear 122 is locked against further rotation.

The rotation of the gear 122 through a predetermined angle in the direction H rotates the gear 123 also in the same direction, turning the clutch cable operating member 112 in the direction F by virtue of the meshing engagement between the gear 123 and the gear portion 135. The member 112 then stops.

With the rotation of the throttle cable operating member 102 through the predetermined angle, the pin 136 which is located on the centerline S when the lever 1 is in position N undergoes a circular arc motion, thereby slightly pulling the inner wire 138 of the throttle cable in the direction J. Because the gear potion 135 is closer to the center C than the gear portion 105, the clutch cable operating member 112 rotates in the direction F by a greater amount than the throttle cable operating member 102, with the result that the pin 143 mounted on the member 112 and located on a line extending from the center C at right angles to the centerline S when the lever 101 is in position N pulls the inner wire 141 of the clutch cable 140 by a larger amount toward the direction L. The wire shifts the engine clutch (not shown) connected thereto for example to forward position.

Figure 8:
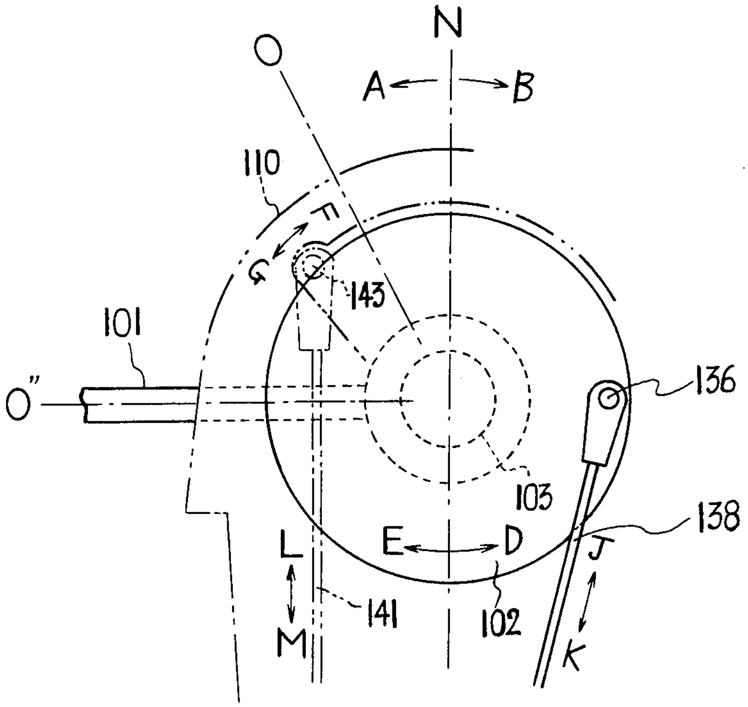
FIG. 8 is a front view showing the principal part of the same during operation with the lever 101 in FIG. 7 further turned in a direction A.

The lever 101 in position O, when turned in the direction A further to position O'' as shown in FIG. 8, rotates the throttle cable operating member 102 further toward the direction D. extent member 102 largely pulls the inner wire 138 in the direction J to advance the throttle to a large extend and to thereby drive the boat forward at a high speed.

On the other hand, despite the turning of the lever 101 from position O toward the direction A, the clutch cable operating member 112 remains against turning since the gear 122 and gear 123 are prevented from rotation. Thus the inner wire 141 of the clutch cable maintains the clutch in its shifted position.

Until the clutch has been completely shifted by the inner wire 141 of the clutch cable being pulled in the direction L by a distance as alreadly described, the inner wire 138 of the throttle cable is also pulled in the direction J although slightly to slightly advance the throttle. Practically, although such initial operation of the throttle is not always objectionable as already stated, this generally causes troubles to the clutch and fails to give very low forward and reverse speeds. It is therefore much desired to prevent the operation of throttle at the initial stage.

The embodiment of this invention further includes means for preventing the initial operation of the throttle by which the throttle, to be otherwise operated by the throttle cable 137, is held out of operation while the lever 1 is turned through a specified angle from position N to O or reversely from position N to O', namely until the clutch is completely shifted to forward or reverse position. The preventing means utilizes the inclination of the guide tube 153 of the throttle cable from the centerline S toward the opposite directions Q and Q' which inclination results from the rotation of the throttle cable operating member 102 in the D and E directions (see FIG. 7).

The means for preventing the initial operation of the throttle may have the same construction as one included in the first embodiment. Alternatively, it may be so modified that the cam plate 25 is removed, with the slot 27 and aperture 26 thereof formed directly in the casing as illustrated in FIGS. 4 and 5. The construction and operation of the modified means will be apparent and are not described therefore. Like parts are referred to by like reference numerals.

The lever 101 in position O'' in FIG. 8, when returned toward position N, rotates the throttle cable operating member 102 in the direction E, whereby the inner wire 138 is pushed toward the direction K to reverse the throttle. When the lever 101 returns to position O, the gear 122 on the coupling shaft comes into meshing engagement with the gear portion 105. Turning of the lever further backward toward position N causes the gears 122 and 123 to rotate in the direction I, thereby turning the clutch cable operating member 112 in the direction G. The member 112 pushes the inner wire 141 in the clutch cable 140 toward the direction M, shifting the clutch to neutral position. The parts are now in the position shown in FIG. 4.

With the rotation of the lever 101 in the direction B, the throttle cable operating member 102 turns in the direction E and rotates the gears 122 and 123 on the coupling shaft 121 in the direction I. The guide tube 153 of the throttle cable inclines in the reverse direction Q' to the direction in FIG. 7, and the inner wire 138 thereof is pulled in the direction J to advance the throttle. At the same time, the clutch cable operating member 112 turns in the direction G, pushing the inner wire 141 in the direction M. The wire 141 shifts the clutch for example to reverse position. In this case also, the means for preventing the initial operation of the throttle keeps the throttle out of operation until the clutch is completely shifted.

To warm up the engine, the coupling shaft 121 is drawn in a direction V in FIG. 5, whereupon a ball 162 placed in a bore 160 in the cover 114 and somewhat spring-biased as at 161 shifts from the groove 125 to groove 126 to engage therein. At the same time, the gear 123 is disengaged from the gear portion 105 and the gear 123 from the gear portion 135. The latter gear 123 engages in the recess 119 and comes into contact with the inner surface 114' of the cover and is thereby held against escapement.

Since the flange 127 on the coupling shaft 121 can pass through only the circular bore 109 in the apertured portion 108 of the throttle cable operating member 102, the shaft 121 is drawable in the direction V only when the lever 101 is in neutral position N.

When the throttle cable operating member 102 is freed from the gear 122 by drawing the shaft 121 in the direction V, the inner wire 138 of the throttle cable is movable independently of the clutch cable operating member 112 by turning the lever 101 in the direction A or B and consequently rotating the operating member 102 in the direction D or E. With the clutch cable operating member 112 in neutral position, one tooth 133' among the gears 133 of the gear 123 is in engagement with the recessed surface 119 of the apertured portion 120 and the adjacent teeth on the opposite sides of the tooth 133' are almost in contact with the curved surface 120 (see FIG. 6), so that the coupling shaft 121 and clutch cable operating member 112 are held out of rotation. Thus during warming up, the clutch is retained in locked position. When the coupling shaft is pushed in with the throttle cable operating member 102 returned to neutral position, the gear 122 meshes with the gear portion 105 always properly. The procedure described above is followed not only for warming up the engine but is also useful for the operation of a generator loaded in the boat.

Although the present embodiment is described above for single lever control, it may become desirable to operate the members 102 and 112 by separate levers respectively. In such event, the coupling shaft 121 and cap 116 are removed, and another lever (not shown) is fixed to the shaft 113 of the clutch cable operating member 112 to render the operating members 102 and 112 turnable completely independently of each other. Thus the embodiment can be modified to a double lever control mechanism in which the throttle cable 137 is controlled by the lever 101, and the clutch cable 140 by the other lever.

To protect the inner wires 138 and 141 from the possible influence of a relatively high pushing load and to prevent them from bending, suitable lengths of these wires at their end portions are preferably replaced by rods as in the first embodiment.

Although the present embodiment includes the coupling shaft 121 provided with the gears 122 and 123 as spaced apart by a distance, these gears need not always be arranged at a spacing but may be in the form of an integral gear like the gear 14 used in the first embodiment. The portion of the integral gear which engages with the gear portion 105 of the throttle operating member 102 is of course provided with at least one untoothed portion.

The second embodiment has various advantages; the embodiment not only fulfils the essential requirements for single lever control mechanisms but can also be readily modified into a double lever control mechanism unlike conventional mechanisms. The embodiment is adapted for use with two engines as sometimes installed on large-sized boats. Since the embodiment includes the coupling shaft 121 which is drawable at the opposite side to the lever, two mechanisms of this invention are then mountable side by side with the levers positioned inside so that the handles of the two levers can be grasped with one hand at the same time. Two engines are thus controllable simultaneously with ease. In this case, the clutch cable 140 of one mechanism of the pair is preferably pivoted to a pin 143' on the clutch cable operating member 112 opposite to the pin 143 (see FIG. 4).

The novel control mechanism of this invention is very simple in construction and smoothly operable free of troubles.

What we claim is:

1. A control mechanism comprising a lever, a throttle operating member turnable by the lever, rotatable gear means having at least one untoothed portion which engages the throttle operating member and is directly rotated thereby, a clutch operating member turnable by the gear means and mounted on a common axis with said throttle operating member and said lever, a throttle cable operable by the throttle operating member and a clutch cable operable by the clutch operating member, the clutch operating member being rockable and the throttle operating member alone being further rotatable after the throttle operating member and the clutch operating member are simultaneously rotated by the turning of the lever.

2. A control mechanism as defined in claim 1 wherein the lever is mounted on a shaft (3) rotatably supported by a casing (2,) the throttle operating member being fixed to the shaft and having a circular arc apertured portion (10) and teeth (11) formed in the apertured portion, the clutch operating member being rotatably mounted on the shaft (3) and having a circular arc apertured portion (12) and teeth (13) formed in the apertured portion, the gear means comprising a gear (14) rotatably mounted on a pin (15) extending from the casing and meshable with the teeth (11) and (13,) the gear (14) having at least one untoothed portion where the gear meshes with the teeth (11).

3. A control mechanism as defined in claim 2 further comprising a cam plate (25) mounted on a frame (22) integral with the casing (2) and having a slot (27) and a cam aperture (26), an idly movable member (28) supported by the cam plate (25) turnably and axially movably relative thereto and having a pin (45) engaged in the cam aperture (26), and a set plate (33) pivoted to the idly movable member (28) and fixedly provided with the outer tube (50) of a throttle cable (5), so that by virtue of inclination of the throttle cable and the idly movable member resulting from the rotation of the throttle operating member, the movement of the outer tube (50) offsets the movement of the inner wire (16) to substantially prevent the movement of the inner wire until the movement of the clutch cable is completed.

4. A control mechansim as defined in claim 3 wherein the cam plate (25) is slidable in parallel to a centerline M and which further comprises a cam (37) movable by the shaft (49) of an auxiliary lever (48) turnably supported by the casing (2) and a link plate (39) movable with the cam (37) in engagement therewith to move the cam plate (25) in parallel to the centerline M, so that the auxiliary lever, when turned, axially moves the outer tube (50) of the throttle cable (5) to effect fine control of movement of the inner wire (16) extending through the outer tube (50).

5. A control mechanism as defined in claim 3, wherein the cam aperture (26) consists only of a curved groove approximately concentric with the throttle operating member.

6. A control mechanism as defined in claim 1 wherein the throttle operating member is rotatably supported by a casing (110) and has a grooved portion (107) including a circular arc surface (106) and a gear portion (105) and a circular arc aperture (108), the clutch operating member being rotatably supported by a cover (114) secured to the casing and having a gear portion (135) and an apertured portion (120) formed with a recess 119, and the gear means comprising a coupling shaft (121) integrally provided with a gear (122), a gear (123) meshable with the gear portion (135) and a flange (127), the gear (122) having at least one untoothed portion and meshable with the gear portion (105).

7. A control mechanism as defined in claim 6 wherein the gears (122) and the gear (123) are provided on the coupling shaft (121) as an integral gear, and the portion of the integral gear which engages with the gear portion (105) of the throttle operating member is provided with at least one untoothed portion.

8. A control mechanism as defined in claim 6 wherein the coupling shaft (121) is axially shiftable only when the throttle operating member and clutch operating members are in neutral position to disengage the gear on the shaft from the gear portion (105) of the throttle operating member.

9. A control mechanism as defined in claim 6 wherein the casing (110) is formed with a cam apertue (26) and a slot (27) and which further comprises an idly movable member (28) supported by the casing (110) turnably and axially movable relative to the casing (110) and having a pin (45) engaged in the cam aperture (26), and a set plate (33) pivoted to the idly movable member (28) and fixedly provided with the outer tube (145) of a throttle cable, so that by virtue of inclination of the throttle cable and the idly movable member resulting from the rotation of the throttle operating member, the movement of the outer tube (145)

offsets the movement of the inner wire (138) to substantially prevent the movement of the inner wire movement of the clutch cable is completed. until the

10. A control mechansim as defined in claim 3, 8 wherein the cam aperture (26) comprises two cam grooves arranged symmetrically of a centerline and having different curvatures, the first cam groove being in the form of a curved groove approximtely concentric with the throttle operating member, the second cam groove bein curved in the opposite directon to the first cam groove.

11. A control mechanism as defined in claim 6 further comprising a cam plate (25) mounted on the casing (110) and having a slot (27) and a cam aperture (26), and idly movable member (28) supported by the cam plate (25) turnably and axially movably relative to the cam plate (25) and having a pin (45) engaged in the cam aperture (26), and a set plate (33) pivoted to the idly movable member (28) and fixedly provided with the outer tube (145) of a throttle cable, so that by virtue of inclination of the throttle cable and the idly movable member resulting from the rotation of the throttle operating member, the movement of the outer tube (145) offsets the movement of the inner wire (138) to substantially prevent the movement of the inner wire (138) until the movement of the clutch cable is completed.

12. A control mechanism comprising a lever, a throttle operating member turnable by the lever, gear means rotatable by the throttle operating member and having at least one untoothed portion, a clutch operating member turnable by the gear means, a throttle cable operable by the throttle operating member and a clutch cable operable by the clutch operating member, the clutch operating member being rockable and the throttle operating member alone being further rotatable after the throttle operating member and the clutch operating member are silumtaneously rotated by the turning of the lever; said throttle operating member being rotatably supported by a casing and having a grooved portion including a circular arc surface and a gear portion and a circular arc aperture, the clutch operating member being rotatably supported by a cover secured to the casing and having a gear portion and an apertured portion formed with a recess, and the gear means comprising a coupling shaft integrally provided with a gear, a gear meshable with the gear portion and a flange, the gear having a least one untoothed portion and meshable with the gear portion.

* * * * *